(12) United States Patent
Mikami

(10) Patent No.: US 6,914,729 B2
(45) Date of Patent: Jul. 5, 2005

(54) LENS BARREL AND PICTURE TAKING APPARATUS HAVING THE SAME

(75) Inventor: Kazuo Mikami, Iruma (JP)

(73) Assignee: Olympus Corporation, Tokyo (JP)

( * ) Notice: Subject to any disclaimer, the term of this patent is extended or adjusted under 35 U.S.C. 154(b) by 42 days.

(21) Appl. No.: 10/359,466

(22) Filed: Feb. 6, 2003

(65) Prior Publication Data

US 2003/0147146 A1 Aug. 7, 2003

(30) Foreign Application Priority Data

Feb. 7, 2002 (JP) ........................................ 2002-031425

(51) Int. Cl.[7] .............................................. G02B 15/14
(52) U.S. Cl. ...................................... 359/696; 359/694
(58) Field of Search ................................ 359/694, 696, 359/703, 704

(56) References Cited

U.S. PATENT DOCUMENTS 6,658,208 B2 * 12/2003 Watanabe et al. ............. 396/89

FOREIGN PATENT DOCUMENTS

| JP | 55-052038 | 4/1980 |
|----|-----------|--------|
| JP | 07-027963 | 1/1995 |
| JP | 08-313788 | 11/1996 |
| JP | 11-072682 | 3/1999 |
| JP | 11-258678 | 9/1999 |

* cited by examiner

*Primary Examiner*—Ricky Mack
(74) *Attorney, Agent, or Firm*—Straub & Pokotylo; John C. Pokotylo

(57) ABSTRACT

A lens barrel movable between a collapsed position and a photographing position, and a picture taking apparatus using the lens barrel. The lens barrel has lens groups movable along an optical axis, a deformable mirror supported in the lens barrel, the deformable mirror having a reflecting surface which varies to vary its optical power, a picture taking optical system including the lens groups and the deformable mirror, and a driving mechanism for retracting the deformable mirror from a light path of the picture taking optical system when the lens barrel lies at the collapsed position, and inserting the deformable mirror into the light path of the picture taking optical system when the lens barrel lies at the photographing position.

30 Claims, 12 Drawing Sheets

FIG.9A Collapsed State

FIG.9B Wide Angle End

FIG.9C Telephoto End

LENS BARREL AND PICTURE TAKING APPARATUS HAVING THE SAME

CROSS-REFERENCE TO RELATED APPLICATION

This application claims benefits of Japanese Patent Application No. 2002-31,425, filed on Feb. 7, 2002, in Japan, the contents of which are hereby incorporated by reference.

BACKGROUND OF THE INVENTION

1. Field of the Invention

The present invention relates to a lens barrel and an image capture apparatus such as a camera having the same.

2. Description of the Related Art

In recently popular, compact zoom cameras, a zoom lens barrel needs to move in (collapse) and out (project) to cover its photographing range from a wide angle state to a telephoto state. A so-called collapsible type zoom lens barrel has also been put to practical use. The collapsible type zoom lens barrel is a zoom lens barrel which, when a camera need not perform photography, is collapsed into, and accommodated within, the body of the camera to make the camera more compact so that a user can easily carry the camera. In addition, in recent years, there have been increasing demands for higher (optical) zooming ratios, and higher zooming ratios lead to a larger difference between the length of a lens barrel in its wide angle state or its collapsed state and the length of the lens barrel in its telephoto state. To cope with this problem, it has been necessary to provide a lens barrel structure which can be extended to a longer length, i.e., a multi-segmented zoom lens barrel.

In addition, there are demands for further miniaturization of cameras having such zoom lens barrels. In view of these demands, numerous proposals have heretofore been made. Examples of arts related to the invention are a lens barrel described in Laid-Open Japanese Patent Application No. Hei 11-258,678 and a collapsible lens mechanism for a single-lens reflex camera described in Laid-Open Japanese Patent Application No. Sho 55-52,038.

The proposal described in the above-recited Laid-Open Japanese Patent Application No. Hei 11-258,678 is a camera including a lens barrel which is made of a first lens group which is stationary at the front position, a plurality of movable lens groups disposed behind the first lens group, optical axis varying means disposed between the front end and the rear end of an optical system composed of the plurality of movable lens groups for varying the direction of an photographing optical axis, and driving means for moving each of the plurality of movable lens groups that are disposed before and behind the optical axis varying means, in the direction of the photographing optical axis. This proposal aims at miniaturizing the entire camera by reducing the diameter of the first lens group lying at the front position (the front lens group).

The proposal described in Laid-Open Japanese Patent Application No. Sho 55-52,038 is a collapsible lens mechanism for a single-lens reflex camera which includes a mechanism for retracting a mirror from a photographing optical axis in combination with the collapsing operation of a lens. This proposal aims to miniaturize the entire camera by collapsing a photographing lens into a position from which the mirror has been retracted.

However, in the proposal described in the above-recited Laid-Open Japanese Patent Application No. Hei 11-258,678, a reflecting mirror which is the optical axis varying means is disposed before an aperture diaphragm, and a plurality of movable lens groups of a variable magnification lens system which indispensably needs a certain degree of moving distance to perform a zooming operation is accommodated in the camera body, so that it is extremely difficult to miniaturize the camera body.

The proposed camera described in Laid-Open Japanese Patent Application No. Sho 55-52,038 is provided with a mechanism for retracting a mirror from a photographing optical axis in combination with the collapsing operation of a lens and which can collapse a photographing lens into a vacant space from which the mirror has been retracted. This art has been practiced for the view finders of single-lens reflex cameras, but is not intended to be applied to picture taking optical systems.

Further, according to the art disclosed in Japanese Patent Laid-Open No. Hei 7-27,963, a zoom lens barrel has a three-step shifting mechanism. More specifically, it has a stationary tube on its outermost circumference, and has a structure which moves an inside frame from a collapsed position to a photography-enabled projected position by means of gears inside the stationary tube. It performs zooming from a wide angle end position to a telephoto end position.

The art disclosed in Japanese Patent Laid-Open No. Hei 8-313,788 has a structure which performs shifting from a collapsed position to a photography-enabled projected position by means of a lead screw and, after that, performs zooming by rotating an outer circumferential rotating frame.

The lens barrel disclosed in Japanese Patent Laid-Open No. Hei 11-72,682 can be driven to switchably perform a set-up shifting movement from a lens-barrel collapsed position to a photography-enabled projected position and a shifting movement within a zooming range. This lens barrel includes a set-up gear for shifting the above-described barrel frame from the collapsed position to the projected position, and a zooming gear for turning the barrel frame at the projected position to perform driving for zooming. The set-up gear and the zooming gear are supported on a stationary frame. Each of the set-up gear and the zooming gear uses an axially long gear which extends into a movement zone from the collapsed position to the projected position.

SUMMARY OF THE INVENTION

The invention aims to reduce the size of a picture taking apparatus such as a camera having a reflecting mirror in its photographing light path.

In accordance with one aspect of the invention, a picture taking apparatus comprises a lens barrel movable between a collapsed state where the lens barrel is accommodated in a body of the apparatus and a photographing state where the lens barrel is projects from the body of the apparatus, a picture taking optical system, a refracting mechanism for retracting the deformable mirror from a light path of the picture taking optical system when the lens barrel is in the collapsed state, and inserting the deformable mirror into the light path of the picture taking optical system when the lens barrel is in the photographing state, and a control part for varying a reflecting surface shape of the deformable mirror to vary optical power thereof. The picture taking optical system includes a lens group driven to move along an optical axis by the lens barrel and a deformable mirror supported in the lens barrel.

In accordance with another aspect of the invention, a lens barrel comprises an optical system including at least one lens and a reflecting member for reflecting light passing through the at least one lens, an image pickup element provided at a position where the image pickup element can receive light reflected from the reflecting member, and a frame which supports the reflecting member and the image pickup element. The reflecting member is supported on the frame in such a manner as to be insertable into and retractable from a light path of the optical system.

In accordance with still another aspect of the invention, an image capture apparatus comprises a lens system including a plurality of lens groups adapted to move along an optical axis which defines at least a part of an image acquiring optical path, and a mirror. The lens system has a first state and a second state, and when the lens system is in the first state, the mirror is positioned in the image acquiring optical path in a defined space, and when the lens system is in the second state, each of at least two of the plurality of lens groups occupy at least a part of the defined space.

In accordance with still another aspect of the invention, an image capture apparatus having an image acquiring optical path, comprises a mirror and a mirror retracting part. The mirror has a first state in which it is positioned in the image acquiring optical path, and a second state in which it is positioned outside the image acquiring optical path. The mirror and mirror retracting part are substantially parallel with respect to each other when the mirror is in the second state.

The other aspects of the invention will become apparent from the following description of examples and the appended claims.

BRIEF DESCRIPTION OF THE DRAWINGS

This invention will become more fully understood from the detailed description given below and the accompanying drawings, which are given by way of illustration only and thus are not limitative of this invention, wherein.

DETAILED DESCRIPTION OF THE EXAMPLES OF THE INVENTION

FIGS. 1 to 13 are views showing examples of a camera according to this invention.

Figure 1:
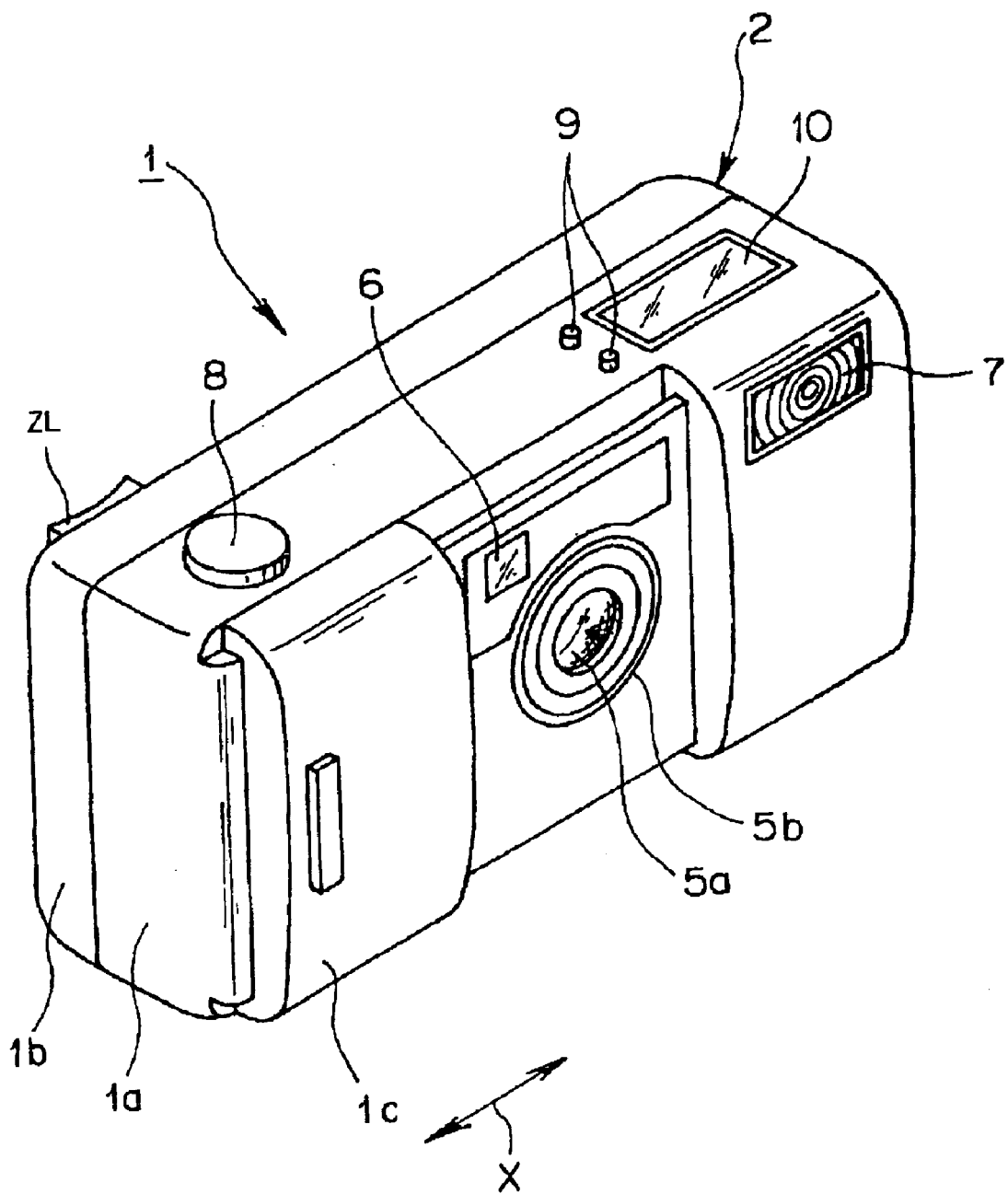
FIG. 1 is a perspective view of one example of a camera according to the invention, showing an external appearance of the camera as viewed from the front side thereof.
Figure 2:
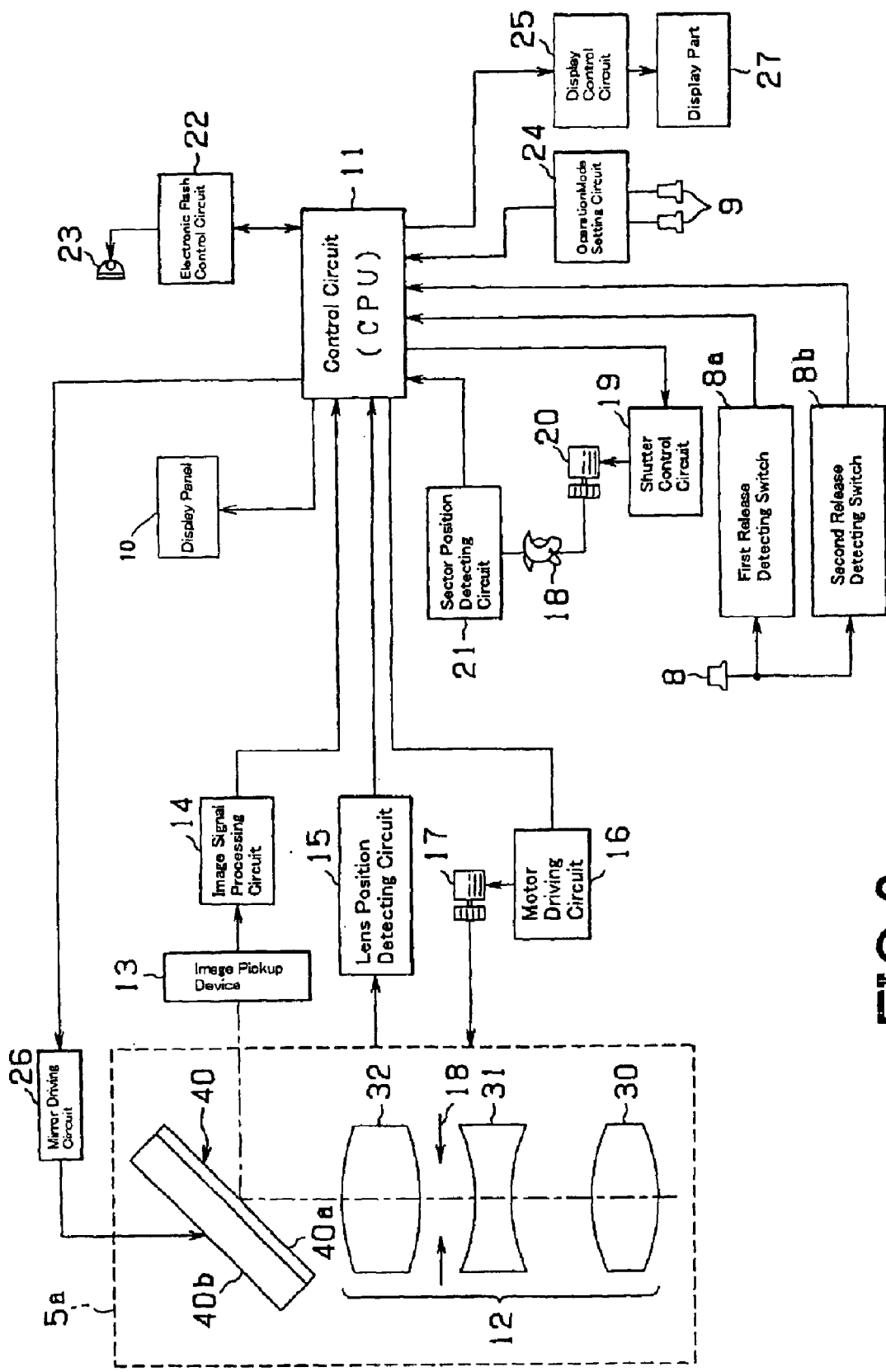
FIG. 2 is a block diagram showing portions of an electrical circuit of the camera.

FIG. 1 is a perspective view of the external appearance of the camera as viewed from the front side thereof, and FIG. 2 is a block diagram showing the essential portions of an electrical circuit of the camera.

The body and the constituent elements of a camera 1 is covered with an exterior member which is mainly formed by a front cover 1a and a back cover 1b which constitute a camera body 2, and a barrier 1c disposed for sliding movement in opposite directions along the front surface of the front cover 1a, i.e., in opposite directions perpendicular to the optical axis of a picture taking optical system 5a (which will be described later).

Various kinds of control members are arranged on exterior surfaces of the exterior member of the camera 1, and various kinds of constituent elements disposed inside the camera 1 are arranged at predetermined positions in such a manner as to be partly exposed to the outside. Control members such as a release button 8 and a plurality of mode switching buttons 9 and a display panel 10 are disposed on the top surface of the camera 1. The release button 8 is a control member to be manipulated by a user when the user is to start a photographing operation. The plurality of mode switching buttons 9 are control members for performing various setting manipulations such as the setting of photographing operation modes, the setting of an internal clock and the setting of the function of an electronic flash. The display panel 10 is made of a liquid crystal display device (abbreviated as LCD) or the like, and visually perceptibly displays photographing mode information, date information, state information as to the camera 1 and other information in a predetermined form such as pictures and characters.

An electronic flash window 7 is arranged at a predetermined position near the top periphery of the front surface of the camera 1 on one side thereof. The electronic flash window 7 protects the front surface of an electronic flash light source 23 (refer to FIG. 2), and irradiates a predetermined area including an object lying on the front side of the camera 1, with a flash of light emitted from the electronic flash light source 23.

The picture taking optical system 5a is arranged approximately in the center of the front surface of the camera 1 in the state of being held by a lens barrel 5b. The picture taking optical system 5a forms an object image on a light-sensitive surface of an image pickup device 13 (refer to FIG. 2) via a deformable mirror 40 arranged in the interior of the camera 1.

A viewfinder window 6 is disposed at the periphery of the picture taking optical system 5a and in the vicinity of the top periphery of the exterior member of the camera 1. This viewfinder window 6 is disposed to cover the front surface of the objective lens of a viewfinder optical system.

A zoom lever ZL or the like to be manipulated by the user when the user is to cause the picture taking optical system 5a to perform a zooming operation is disposed at a position near the top periphery of the back surface of the camera 1 on the opposite side thereof. The barrier 1c is disposed for sliding movement with respect to the front cover 1a in the opposite directions indicated by an arrow X in FIG. 1. This barrier 1c is arranged so that when the user is to perform photography with the camera 1, the user slides the barrier 1c to the left as shown in FIG. 1, whereby the barrier 1c can turn on the power source of the camera 1 in combination with a power source switch (not shown) inside the camera 1. When the user is to stop photography and carry or keep the camera 1, the user slides the barrier 1c to the right as shown in FIG. 1, whereby the barrier 1c can initiate retracting the lens barrel and turn off the power source of the camera 1 similarly in combination with the power source switch, and covers and protects constituent parts such as the picture taking optical system 5a, the lens barrel 5b and the viewfinder window 6 disposed on the front surface of the camera 1. In addition, when the barrier 1c is opened from a closed position, the lens barrel 5b which is in a collapsed state is set up at a wide angle end position in which the focal length of the picture taking optical system 5a is shortest. Incidentally, the state shown in FIG. 1 represents the state in which the barrier 1c is in an open state and the lens barrel 5b is still collapsed.

The construction of the electrical circuit incorporated in the camera 1 will be described below in detail with reference to FIG. 2.

As shown in FIG. 2, the camera 1 mainly includes a control circuit 11, the picture taking optical system 5a containing a variable magnification lens system 12 and the deformable mirror 40, the image pickup device 13, an image signal processing circuit 14, a lens position detecting circuit 15, a motor driving circuit 16, driving motors 17 and 20, an aperture diaphragm 18, a shutter control circuit 19, a sector position detecting circuit 21, an electronic flash control circuit 22, the electronic flash light source 23, an operation mode setting circuit 24, a display control circuit 25, a mirror driving circuit 26, a display part 27 such as an LCD, first and second release detecting switches 8a and 8b each of which detects a state of the release button 8, the mode switching buttons 9 and the display panel 10. In this example, the display part 27 is disposed on the back surface of the camera 1, and is not shown in FIG. 1.

The control circuit 11 is made of, for example, a CPU, and is control means for controlling various kinds of operations of the entire camera 1.

In the camera 1, the picture taking optical system 5a includes the variable magnification lens system 12, the aperture diaphragm 18 and the deformable mirror 40. The variable magnification lens system 12 is made of first, second and third lens groups 30, 31 and 32 and is driven in the direction of its optical axis by the lens barrel 5b (refer to FIG. 1) which can move between a collapsed position at which the lens barrel 5b is accommodated in the camera body 2 and a photographing position at which the lens barrel 5b extends from the camera body 2. The aperture diaphragm 18 is disposed between the second lens group 31 and the third lens group 32. The deformable mirror 40 is supported to be insertable into and retractable from the light path of these lens groups 30, 31 and 32, and is disposed at the rear stage of the aperture diaphragm 18. A more detailed description of the construction of exemplary deformable mirrors will be given later.

Light from an object which has passed through the first, second and third lens groups 30, 31 and 32 is reflected by the deformable mirror 40 and is made incident on the light-sensitive surface of the image pickup device 13, thereby forming an object image on the image pickup device 13. The image pickup device 13 converts the formed object image into an analog image signal, and supplies the analog image signal to the image signal processing circuit 14.

The image signal processing circuit 14 applies digitizing processing to the supplied analog image signal, performs the signal processing to display the digital image signal on the display part 27 including the LCD, as well as various kinds of processing to perform contrast detection type auto-focus, and supplies the obtained picked-up image data to the CPU 11. Typically, to conserve the battery of the camera, image data is not displayed on the LCD until the user manipulates the camera. When the user manipulates the camera, the CPU 11 supplies to the display control circuit 25 the picked-up image data containing the image signal supplied from the image signal processing circuit 14. At the same time, the CPU 11 performs control on the display control circuit 25 so that an image based on the picked-up image data is displayed on the display part 27 such as an LCD provided on, for example, the back surface of the camera body 2. Namely, the display part 27 displays information such as the date of photography and the f-number and the shutter speed used for photography, together with the picked-up image signal. In addition, the CPU 11, on the basis of the supplied picked-up image data (contrast data), controls the shape of the reflecting surface of the deformable mirror 40 so that contrast reaches a peak.

The lens position detecting circuit 15 detects the state of movement of each of the lens groups 30, 31 and 32 in the variable magnification lens system 12, respectively, during, for example, a zooming operation, and outputs the detection result to the CPU 11. When the CPU 11 receives the detection result, the CPU 11 controls on the motor driving circuit 16 on the basis of the detection result from the lens position detecting circuit 15. The rotational driving force of the driving motor 17 is transmitted to a lens barrel driving mechanism which is not shown, whereby each of the lens groups 30, 31 and 32 can be moved to a zooming position according to inputs commanded from the user.

The aperture diaphragm 18 is arranged between the second lens group 31 and the third lens group 32 in the picture taking optical system 5a. The aperture diaphragm 18 is operated by the motor 20 via a shutter driving mechanism which is not shown, and the motor is controlled by the shutter control circuit 19. For example, when the aperture diaphragm 18 is brought to an open state, an object image is formed on the image pickup device 13. The sector position detecting circuit 21 detects the state of opening or closure of the aperture diaphragm 18, and outputs the detection result to the CPU 11. When the CPU 11 receives the detection result, the CPU 11 instructs and controls the shutter control circuit 19 on the basis of the detection result from the sector position detecting circuit 21, thereby controlling the opening/closing operation, the shutter speed and the like of the aperture diaphragm 18.

The electronic flash control circuit 22 is a circuit which is, at the time of the execution of an electronic flash photography mode, charged with the voltage required to cause the electronic flash light source 23 to emit a flash of light and applies this charged voltage to the electronic flash light source 23 to cause it to emit a flash of light. The operation of the electronic flash control circuit 22 is controlled by the CPU 11.

The release button 8 of a two-stroke type is adopted in the camera 1. As shown in FIG. 2, the release button 8 is provided with the first release detecting switch 8a and the second release detecting switch 8b. These release detecting switches 8a and 8b are switches which operate in combination with the release button 8, and when the release button 8 is depressed to a first stroke position, the first release detecting switch 8a is turned on, and subsequently, when the release button 8 is further depressed to a second stroke position, the second release detecting switch 8b is turned on.

A switch manipulation signal from each of the release detecting switches 8a and 8b is supplied to the CPU 11.

When the CPU 11 recognizes from the supplied switch manipulation signal that the first release detecting switch 8a has been turned on, the CPU 11 performs control to execute AF (auto-focusing) and photometric measurement operations. Further, when the CPU 11 recognizes that the second release detecting switch 8b has been turned on, the CPU 11 performs control to execute a photographing operation. The photographing operation is executed on the basis of a photographing mode set by the operation mode setting circuit 24 via the mode switching buttons 9.

In the camera 1, as shown in FIG. 2, the deformable mirror 40, having an electrically variable surface shape and therefore variable optical characteristics, is provided in the light path of the picture taking optical system 5a. The camera 1 is provided with the deformable mirror 40 having the optical function of reflecting light supplied from the variable magnification lens system 12 onto the image pickup device 13 disposed on a side portion of a stationary frame 50 (refer to FIG. 6) in the lens barrel 5b. Accordingly, it is possible to minimize the camera body 2 by means of a simple construction. In addition, it is possible to execute the focusing of the picture taking optical system 5a without a mechanical driving mechanism by varying the shape of the reflecting surface of the deformable mirror 40.

More specifically, the deformable mirror 40 is secured to the inside of the stationary frame 50 (refer to FIG. 6) of the lens barrel 5b via a link mechanism 60 (refer to FIG. 10), and is supported to be insertable into and retractable from the light path of the first, second and third lens groups 30, 31 and 32. When the lens barrel 5b is placed at the collapsed position, the link mechanism 60 retracts the deformable mirror 40 from the light path of the first, second and third lens groups 30, 31 and 32. When the lens barrel 5b is placed at the photographing position so that the camera 1 can perform a photographing operation, the link mechanism 60 inserts the deformable mirror 40 into the light path of the first, second and third lens groups 30, 31 and 32. Construction details of an exemplary link mechanism 60 will be described later.

The deformable mirror 40 is made of a reflecting surface 40a and electrodes 40b for controlling the shape of the reflecting surface 40a, and the electrodes 40b are driven by the voltage supplied from the mirror driving circuit 26. Namely, the CPU 11 performs driving control on the mirror driving circuit 26, thereby varying the shape of the reflecting surface of the deformable mirror 40 based on the status of photography.

Exemplary deformable mirrors 40 will be described below in greater detail with reference to FIGS. 3 to 5.

Figure 3:
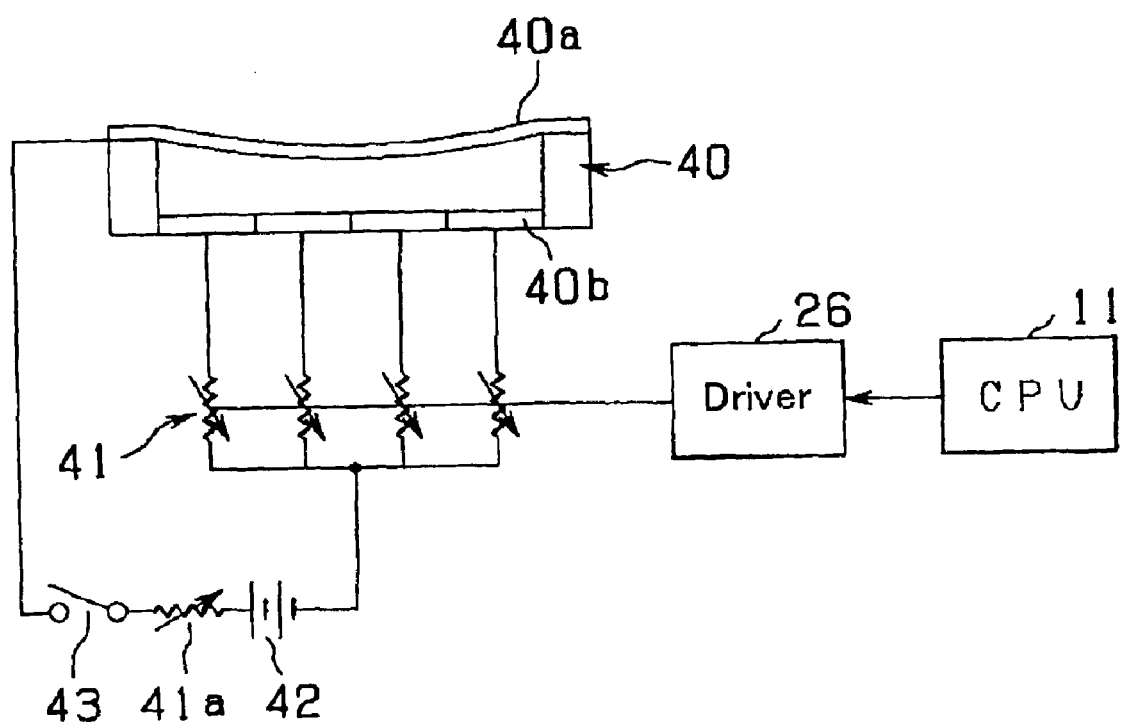
FIG. 3 is a view showing a deformable mirror fitted in the camera and elements for driving the deformable mirror.
Figure 4:
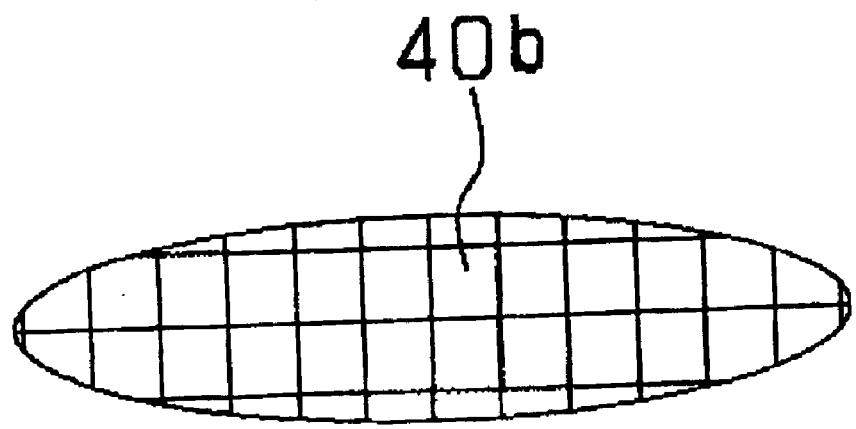
FIG. 4 is an explanatory view showing one example of the electrodes used with the deformable mirror.
Figure 5:
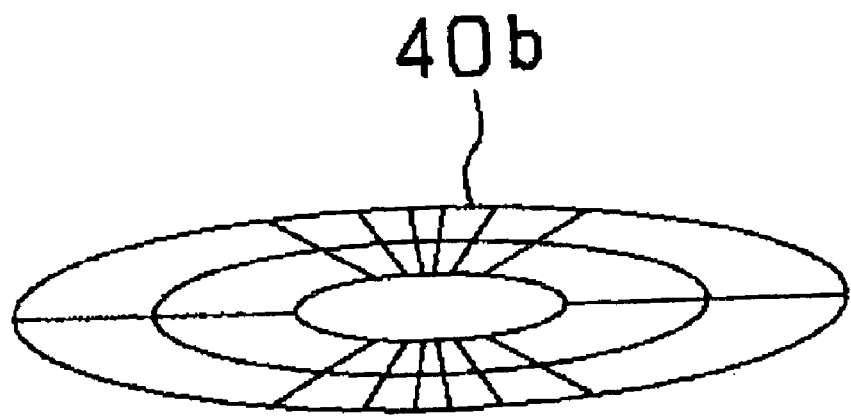
FIG. 5 is an explanatory view showing another example of the electrodes used with the deformable mirror.

FIG. 3 is a view showing the deformable mirror 40 fitted in the camera 1 and elements for driving the deformable mirror 40, FIG. 4 is a view showing one example of the electrodes 40b used with the deformable mirror 40, and FIG. 5 is a view showing another example of the electrodes 40b used with the deformable mirror 40.

As shown in FIG. 3, the deformable mirror 40 is made of the plurality of electrodes 40b and a thin film 40a formed as the reflecting surface by aluminum coating. By varying the shape of the reflecting surface 40a, optical characteristics of the mirror can be varied.

A plurality of variable resistors 41 are electrically connected to the plurality of electrodes 40b, respectively, and the variable resistors 41 are constructed so that their resistance values can be variably controlled when the CPU 11 performs driving control on the mirror driving circuit 26. Namely, the driver 26 serves as a driving circuit for possibly independently, controlling the resistance values of the plurality of variable resistors 41.

The other electrodes of these variable resistors 41 are connected to the negative pole of a power source 42, and the positive pole of the power source 42 is connected to another variable resistor 41a. The other electrode of the variable resistor 41a is connected to a power source switch 43, and the other end of the power source switch 43 is connected to the thin film 40a of the deformable mirror 40. The plurality of variable resistors 41, the power source 42, the variable resistor 41a and the power source switch 43, all of which are electrically connected, are arranged between the thin film 40a and the electrodes 40b.

The thin film 40a is, for example, a membrane mirror of the type described in P. Rai-choudhury, Handbook of Microlithography, Micromachining and Microfabrication, Volume 2: Micromachining and Microfabrication, p. 495, FIG. 8.58, SPIE PRESS or of the type described in Optics Communication, Volume 140 (1997), pp. 187–190. Namely, when voltage is applied across the thin film 40a and the plurality of electrodes 40b, the thin film 40a is deformed by electrostatic force so that the surface shape of the thin film 40a is varied and the optical power of the reflecting surface is varied, whereby focusing can be effected.

Incidentally, it is also possible to set the amount of deformation and/or the mode of variation of the surface shape in order to compensate for a degradation in image-forming performance caused by the deformation of or variations in the refractive indices of the other lens groups due to variations in temperature or humidity, the expansion or shrinkage of a lens supporting frame, and the assembly error of parts such as optical elements and frames. In addition, both focusing and correction of aberration due to focusing can also be effected by the deformable mirror.

The shapes of the electrodes 40b may be selected according to the desired manner of deformation of the thin film 40a, as shown in FIGS. 4 and 5 by way of example. In addition, the deformable mirror 40 of high precision can be obtained by using lithography to fabricate it.

The CPU 11 varies the resistance value of each of the variable resistors 41, thereby controlling the shape of the thin film 40a to optimize the image-forming performance of the picture taking optical system 5a. Namely, the signal outputted from the image signal processing circuit 14 is inputted to the CPU 11. Then, on the basis of this input signal, the CPU 11 outputs a signal for determining the resistance values of the respective variable resistors 41 that are appropriate for compensating for a degradation in the image-forming performance which depends on the distance to an object. Voltages to be applied to the respective electrodes 40b are determined by those resistance values. Since the thin film 40a is deformed by the voltages applied to the respective electrodes 40b, i.e., electrostatic force, the shape of the thin film 40a is optimized. The thin film 40a can assume various shapes including the shape of an aspherical surface.

In the case of this example, focusing can be executed, at least in-part, by varying the shape of the deformable mirror 40. An image is considered to be in focus when the high-frequency component of an image signal supplied from the image pickup device 13 reaches its maximum.

In addition, it is convenient to fabricate the thin film 40a with a synthetic resin such as polyimide, because large deformation of such thin films can be caused even by low voltages.

The construction and the operation of the lens barrel 5b in which the deformable mirror 40 is fitted will be described below in detail with reference to FIGS. 6 to 9C.

Figure 6:
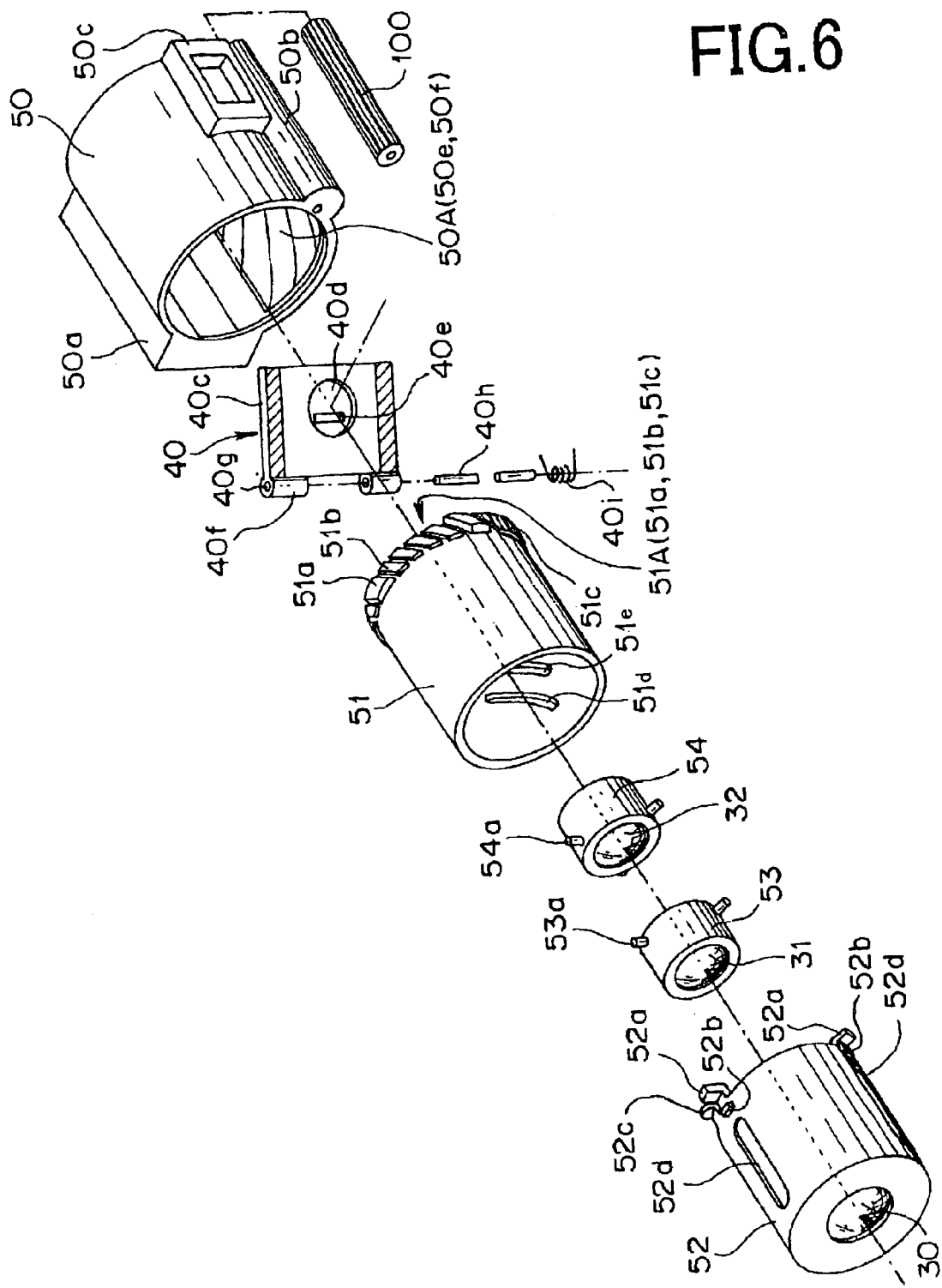
FIG. 6 is an exploded perspective view of a lens barrel capable of zooming.
Figure 7:
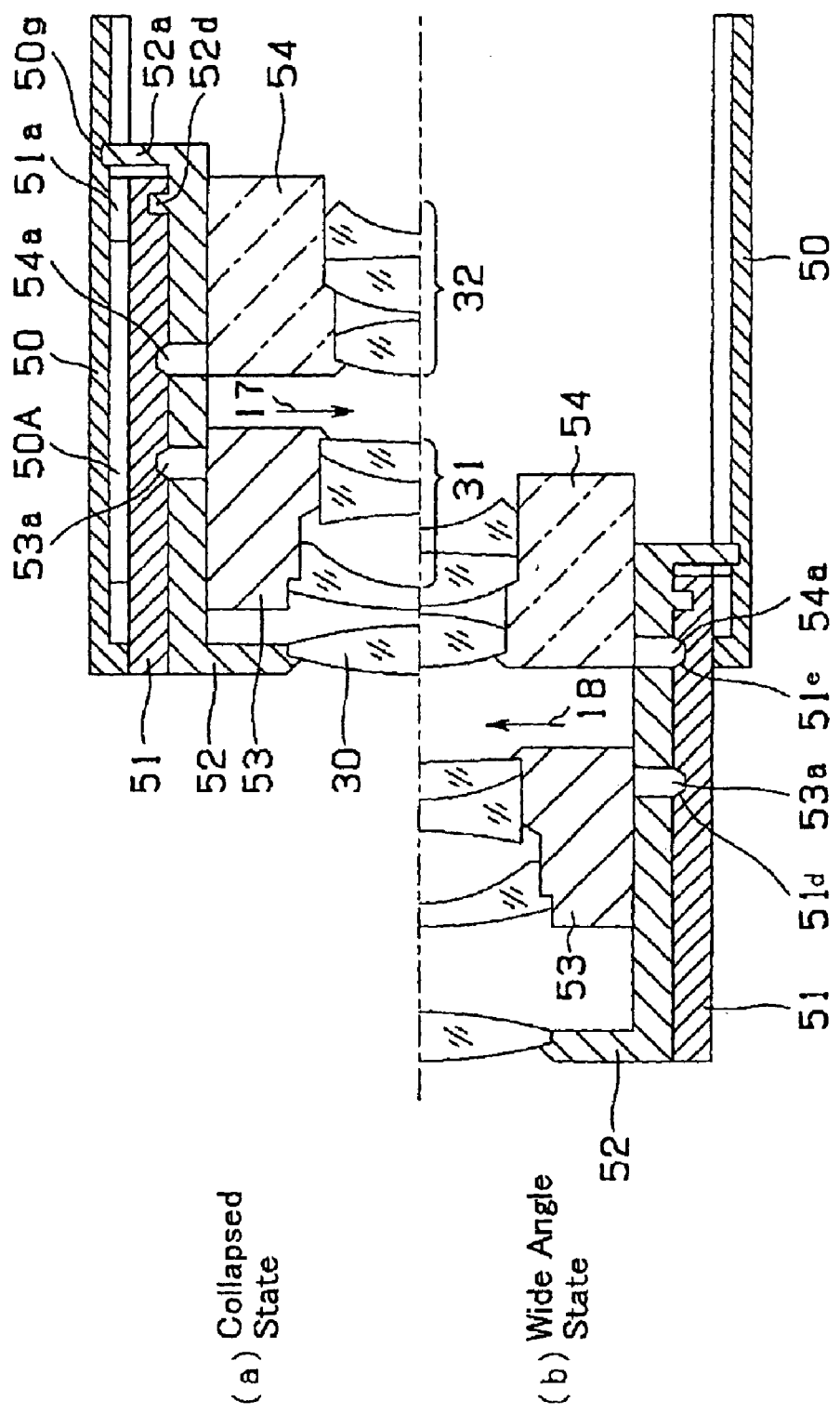
FIG. 7 is an explanatory cross-sectional view of the construction of the lens barrel which varies during zooming.
Figure 8:
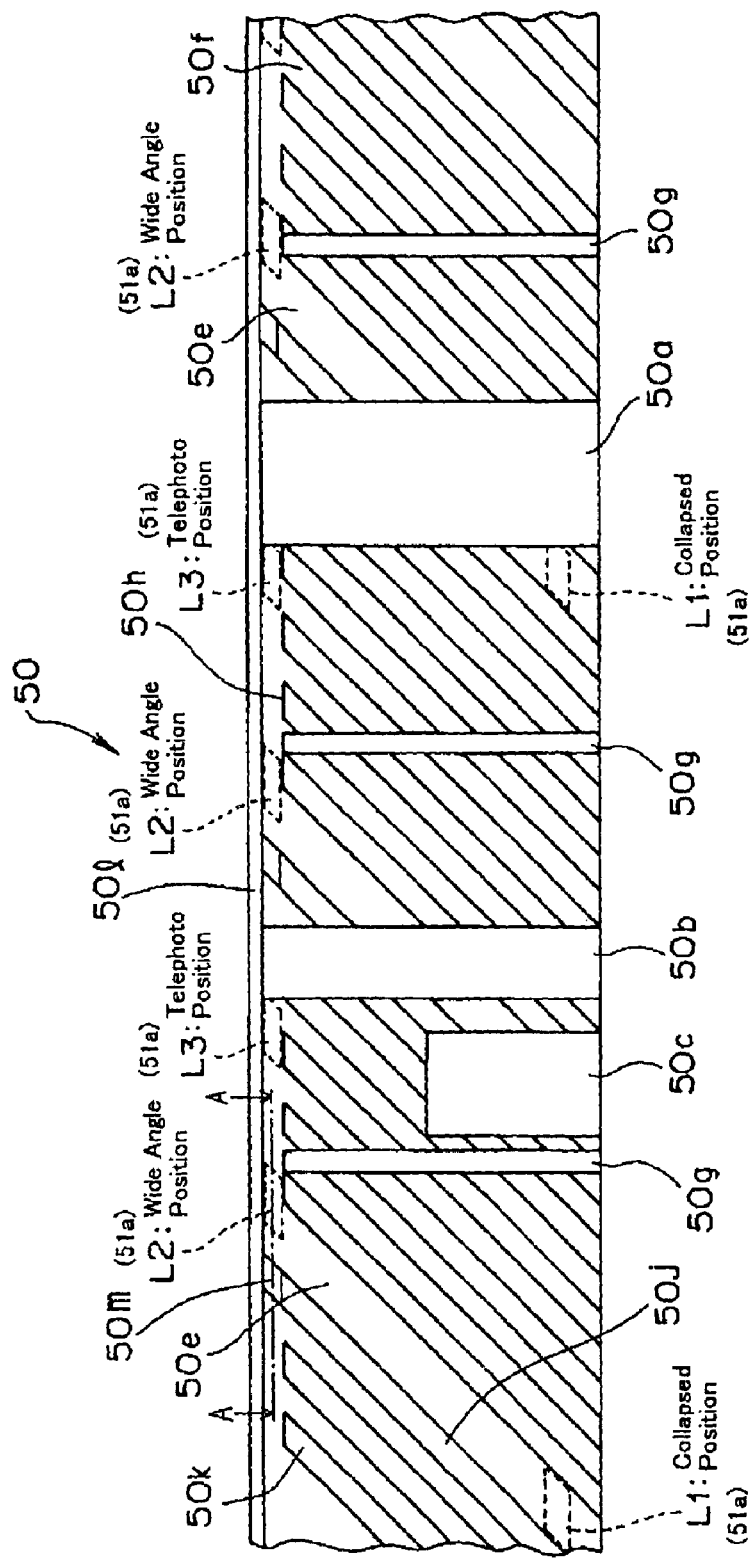
FIG. 8 is a developed view of the inner circumferential surface of the stationary frame shown in FIG. 7.
Figure 9:
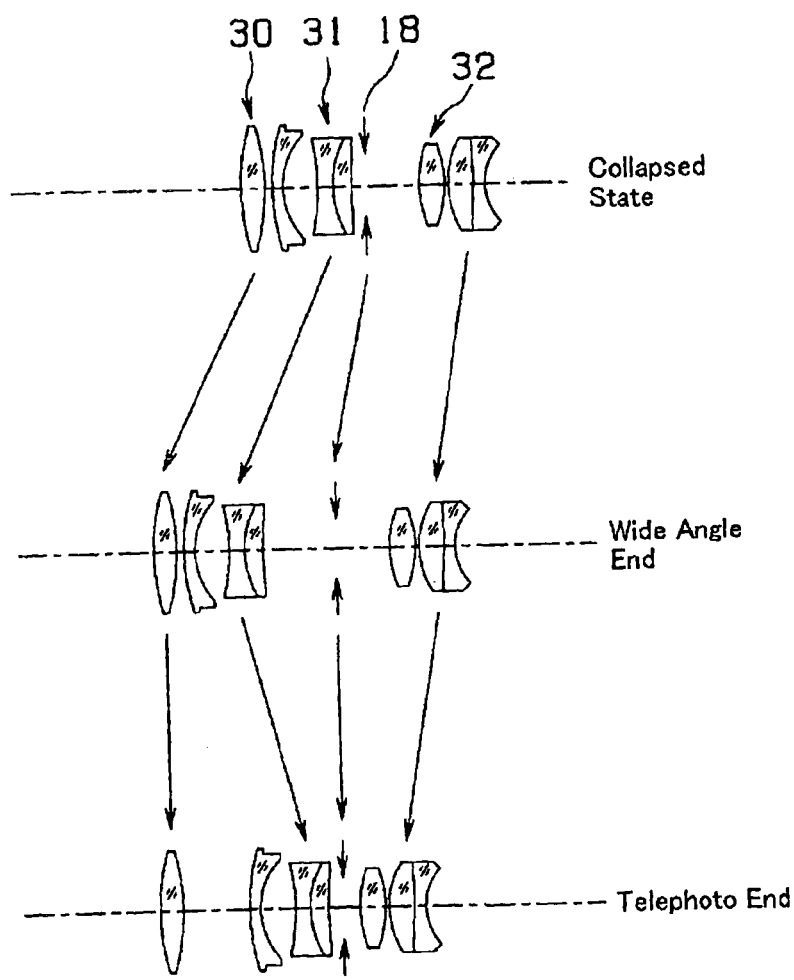
FIGS. 9A–9C are explanatory views of shifting movement which occurs during the zooming of the lens barrel.

FIG. 6 is an exploded perspective view of the whole of the lens barrel 5b capable of zooming, and FIG. 7 is an explanatory view of the construction of the lens barrel 5b which varies during zooming. FIGS. 7(a) and 7(b) respectively show the collapsed state and the wide angle state of the lens barrel 5b. FIG. 8 is a developed view of the inner circumferential surface of the stationary frame 50 shown in FIG. 7, and FIGS. 9A–9C are explanatory views of lateral lens movement which occurs during the zooming of the lens barrel 5b. In the following description, it is assumed that the object side of the lens barrel 5b is the front side and the image side of the lens barrel 5b is the rear side. In addition, directions parallel to the optical axis of a zoom lens which is made of the first lens group 30, the second lens group 31 and the third lens group 32 are called an S0 directions, and the directions of rotation about the optical axis are represented by rotational directions as viewed from the object side.

As shown in FIGS. 6 and 7, the lens barrel 5b includes the stationary frame 50 which is fixedly supported on the camera body 2 and in which the deformable mirror 40 is incorporated, a cam frame 51 which is fitted in the stationary frame 50 for rotation about the optical axis and for movement in the S0 directions, a zooming frame (also called a first lens group supporting frame) 52 which is fitted in the cam frame 51 for turning movement about the optical axis with respect to the cam frame 51 and for movement back and forth integrally with the cam frame 51 in the S0 directions, a second lens group supporting frame 53 which is fitted in the zooming frame 52 for movement in the S0 directions, a third lens group supporting frame 54 which is fitted in the zooming frame 52 for movement in the S0 directions, the deformable mirror 40 which is fitted for turning movement in a mirror holding part 50a of the stationary frame 50, the aperture diaphragm 18 which, although not shown in either of FIGS. 6 or 7, is arranged in the zooming frame 52 and disposed between the second lens group supporting frame 53 and the third lens group supporting frame 54, and a driving gear 100 which is disposed in the stationary frame 50 to transmit a driving force from a zooming unit (not shown) to the cam frame 51.

Further, the lens barrel 5b has, as the picture taking zoom lens optical system 5a, the first lens group 30 supported on the zooming frame 52, the second lens group 31 supported on the second lens group supporting frame 53, and the third lens group 32 supported on the third lens group supporting frame 54.

The stationary frame 50 is a ring-shaped member having openings at its front end (the object side) and at its rear end (the image side), respectively, and has a female helicoid part 50A provided on the inner circumferential part of the stationary frame 50 and made of female helicoid gears 50e for restricting a set-up position and a plurality of female helicoid gears 50f formed on the inner circumferential part, linear guide grooves 50g (refer to FIG. 7) which are grooves respectively arranged at circumferentially different positions and formed to extend in the direction of the optical axis in concave shapes in cross section, a gear chamber 50b formed to extend in the direction of the optical axis in a concave shape in cross section, the mirror holding part 50a which is formed in such a manner that the outer circumferential part of the stationary frame 50 is partly projected and which is arranged to turnably support the deformable mirror 40 at a predetermined position inside the mirror holding part 50a, and a CCD holding part 50c disposed in opposition to the mirror holding part 50a and formed so that an image pickup member such as the image pickup device 13 is fixed inside the CCD holding part 50c.

A specific construction of the deformable mirror 40 is shown in FIG. 6. A mirror holding frame 40c is fitted to the mirror holding part 50a of the stationary frame 50 by the link mechanism 60 which will be described later, and accommodates a deformable mirror body. The deformable mirror body is held by being fixed to a holding part 40d formed in a concave shape in the mirror holding frame 40c. A flexible printed circuit board inserting hole 40e for leading a flexible printed circuit board (not shown) electrically connected to the deformable mirror 40 to the back side of the deformable mirror 40 is formed in the holding part 40d. Bearing parts 40f each having a hole 40g through which to insert a mirror turning shaft 40h are formed on the proximal side of the mirror holding frame 40c. The mirror turning shaft 40h (the middle portion of which is cut away for simplicity) is pivotally supported in the mirror holding part 50a of the stationary frame 50. An urging spring 40i is engaged with the mirror holding part 50a of the stationary frame 50 and the bearing parts 40f, and normally urges the mirror holding frame 40c toward the interior of the stationary frame 50 (in the direction of the optical axis).

A structure for securing the deformable mirror 40 and the image pickup device 13 to the stationary frame 50 will be described later.

The cam frame 51 is a ring-shaped member having openings at its front and rear ends, respectively, and a male helicoid part 51A is formed on the outer circumferential part of the cam frame 51 at the rear (image side) end thereof. The male helicoid part 51A is made of male helicoid gears 51a for restricting a set-up position, which are respectively formed at three positions to have predetermined widths in the direction of the optical axis, male helicoid gears 51b arranged at a plurality of circumferential positions and formed to be smaller in width than the male helicoid gears 51a for restricting a set-up position, and a gear part 51c disposed at a position where the male helicoid gears 51b are disposed.

The inner circumferential part of the cam frame 51 is provided with three second lens group guiding cam grooves 51d and three third lens group guiding cam grooves 51e which extend in the same direction as, or without crossing, the second lens group guiding cam grooves 51d.

When the lens barrel 5b is in an assembled state, the male helicoid part 51A of the cam frame 51 meshes with the female helicoid part 50A of the stationary frame 50, and the cam frame 51 is allowed to move back and forth in the S0 directions of the optical axis while turning with respect to the stationary frame 50. The driving gear 100 which is formed of a spur gear which is axially long is rotatably inserted in the gear chamber 50b of the stationary frame 50 in parallel with the optical axis. The driving gear 100 normally meshes with the gear part 51c of the cam frame 51 and transmits rotating force to the cam frame 51.

The zooming frame 52 is a ring-shaped member having an openings at its rear end and a lens holding part (not shown) for holding the first lens group 30, at its front end. Second and third lens group guiding linear grooves 52d are provided in the outer circumferential part of the zooming frame 52.

Further, the outer circumferential part of the rear end of the zooming frame 52 is provided with three linear guide parts 52a which extend radially outwardly, bayonet claws 52b respectively arranged near the linear guide parts 52a, and a pressing part 52c which comes into contact with the link mechanism 60 to turn the deformable mirror 40.

When the lens barrel 5b is in an assembled state, the zooming frame 52 is fitted in the cam frame 51 with the respective linear guide parts 52a engaged with the linear guide grooves 50g (refer to FIG. 7) of the stationary frame 50. In this case, the zooming frame 52 is bayonet-mounted to the inner circumferential surface of the cam frame 51 by the bayonet claws 52b. Accordingly, since the rotation of the zooming frame 52 is restricted, the zooming frame 52 moves back and forth in the direction of the optical axis according to the rotation of the cam frame 51 without rotating in itself.

The second lens group supporting frame 53 is an approximately ring-shaped frame member having a central opening, and three second lens group guiding pins 53a are fixed to the rear end of the outer circumferential surface of the second lens group supporting frame 53. The second lens group 31 is held in the central opening. The third lens group supporting frame 54 is a ring-shaped frame member having a central opening and holding the third lens group 32 in this central opening, and three third lens group guiding pins 54a are fixed to the outer circumferential surface of the third lens group supporting frame 54 in the vicinity of this central opening.

When the lens barrel 5b is in an assembled state, the second lens group supporting frame 53 is fitted in the zooming frame 52 for sliding movement in the direction of the optical axis with the three second lens group guiding pins 53a of the outer circumferential part of the second lens group supporting frame 53 brought in engagement with the second and third lens group guiding linear grooves 52d of the zooming frame 52, respectively. Accordingly, the second lens group supporting frame 53 is guided in the S0 directions by the second and third lens group guiding linear grooves 52d of the zooming frame 52 and is driven in the direction of the optical axis by the second lens group guiding cam grooves 51d of the cam frame 51. The third lens group supporting frame 54 is fitted in the zooming frame 52 for sliding movement in the direction of the optical axis with the three third lens group guiding pins 54a of the outer circumferential part of the third lens group supporting frame 54 brought in engagement with the second and third lens group guiding linear grooves 52d of the zooming frame 52, respectively. Accordingly, the third lens group supporting frame 54 is guided in the S0 directions by the second and third lens group guiding linear grooves 52d of the zooming frame 52 and is driven back and forth in the direction of the optical axis by the three third lens group guiding cam grooves 51d of the cam frame 51.

The forward and backward movements during zooming of the lens barrel 5b having the above-described construction will be described below in detail with reference to FIGS. 7 to 9C.

As shown in the partial cross-sectional view of FIG. 7(a), when the lens barrel 5b is in the collapsed state, all the frames are accommodated in the interior of the stationary frame 50. During this time, the set-up position restricting male helicoid gears 51a of the cam frame 51 are respectively arranged at collapsed positions L1 of the set-up position restricting female helocoid gears 50a of the stationary frame 50 engaged therewith as shown in FIG. 8.

When the lens barrel 5b is to be shifted from the collapsed state to the photography-enabled wide angle state shown in the cross-sectional view of FIG. 7(b), the driving gear 100 is rotated counterclockwise by a predetermined amount via the zooming unit (driving mechanism) which is not shown.

Then, the cam frame 51 is shifted while being rotated by the rotation of the driving gear 100. During this time, the cam frame 51 linearly moves relatively forwardly together with the zooming frame 52 guided linearly in an S0 direction.

The second lens group supporting frame 53 is shifted to the wide angle end position by the cam frame 51 while being guided linearly in the S0 direction with the second lens group guiding pins 53a engaging with the second and third lens group guiding linear grooves 52d of the zooming frame 52. Namely, the second lens group guiding pins 53a move along the second lens group guiding cam grooves 51d of the cam frame 51 which is rotating, whereby the second lens group supporting frame 53 is shifted to the wide angle end position.

The third lens group supporting frame 54 is shifted to the wide angle end position by the cam frame 51 while being guided linearly in the S0 direction with the third lens group guiding pins 54a engaging with the second and third lens group guiding linear grooves 52d of the zooming frame 52. Namely, the third lens group guiding pins 54a move along the third lens group guiding cam grooves 51e of the cam frame 51 which is rotating, whereby the third lens group supporting frame 54 is shifted to the wide angle end position.

At this time, as shown in FIG. 8, the set-up position restricting male helicoid gears 51a of the cam frame 51 disengage from the set-up position restricting female helicoid gears 50e of the stationary frame 50 and come respectively to wide angle positions L2 in a set-up position restricting groove 50h formed to extend in the circumferential direction at an end portion of the stationary frame 50.

When the lens barrel 5b is to be shifted from the wide angle state to the telephoto state shown in FIGS. 9B–9C, the driving gear 100 is rotated further counterclockwise by a predetermined amount. Then, as the cam frame 51 is rotated by the rotation of the driving gear 100, the second lens group guiding pins 53a move along the second lens group guiding cam grooves 51d of the cam frame 51 which is rotating, whereby the second lens group supporting frame 53 is moved to a telephoto end position (refer to FIG. 9C). At the same time, as the third lens group guiding pins 54a move along the third lens group guiding cam grooves 51e of the cam frame 51 which is rotating, the third lens group supporting frame 54 is also shifted to the telephoto end position (refer to FIG. 9C). At this time, also as shown in FIG. 8, the set-up position restricting male helicoid gears 51a of the cam frame 51 come respectively to telephoto end positions L3 in the set-up position restricting groove 50h of the stationary frame 50.

On the other hand, when the lens barrel 5b is to be shifted into the collapsed state, the driving gear 100 is rotated clockwise via the zooming unit (driving mechanism) which is not shown. The cam frame 51 and the zooming frame 52 are relatively shifted by the rotation of the driving gear 100, and the second lens group supporting frame 53 and the third lens group supporting frame 54 are also relatively shifted to the collapsed position by the reverse rotation of the cam frame 51.

The relative amounts of movements of the first to third lens groups 30 to 32 during a zooming operation is shown in FIGS. 9A–9C. This movement relationship similarly applies to the relationship between the zooming frame 52 provided with the first lens group 30, the second lens group supporting frame 53 and the third lens group supporting frame 54. Namely, when the lens barrel 5b is collapsed, the first to third lens groups 30 to 32 are accommodated in the stationary frame 50 in the state of being spaced apart from one another at predetermined intervals as shown in FIG. 9A. When the lens barrel 5b is to be shifted from the collapsed state to the wide angle end state, the first lens group 30, the second lens group 31 and the third lens group 32 are relatively shifted so that the distance between the first lens group 30 and the third lens group 32 increases with the distance between the first lens group 30 and the second lens group 31 remaining unchanged to maintain the predetermined interval, as shown in FIG. 9B. After that, when the lens barrel 5b is to be shifted from the wide angle end position to the telephoto end position, the second lens group 31 and the third lens group 32 are respectively moved so that the distance between the second lens group 31 and the third lens group 32 decreases with the position of the first lens group 30 remaining unchanged, as shown in FIG. 9C.

Figure 13:
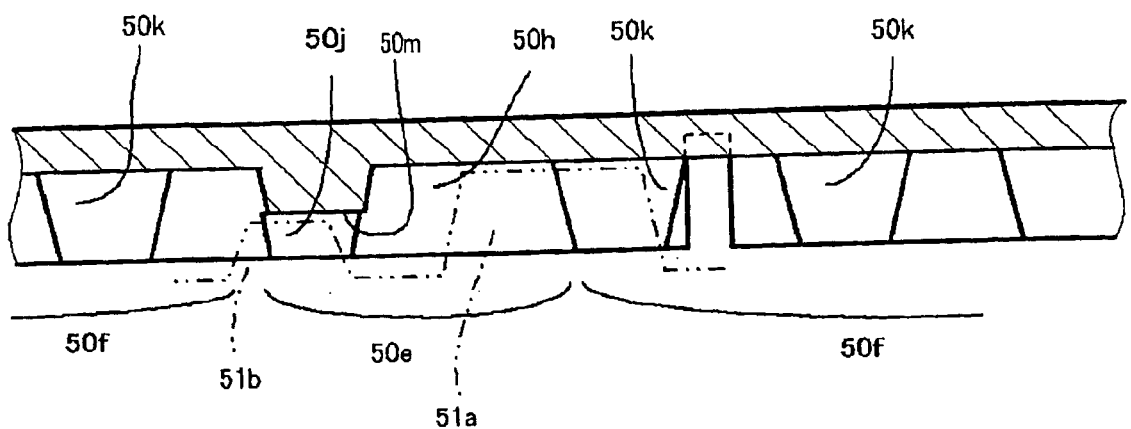
FIG. 13 is a view showing an A—A cross section of the stationary frame in FIG. 8.

Further, the positioning of the cam frame 51 in the lens barrel 5b of this example in the direction of the optical axis will be described below in detail with reference to FIG. 13 as well. In FIG. 13, the stationary frame 50 is referred to as a first frame, and the cam frame 51 is referred to as a second frame.

FIG. 13 is a view showing an A—A cross section in FIG. 8, and is a cross-sectional view showing a portion of a position restricting groove for a second frame. Incidentally, in FIG. 13, one of the male helicoid gears 51a of the cam frame 51, which lies at a position L2, is shown by a dot-dot-dashed line.

As shown in FIG. 13, the set-up position restricting male helicoid gears 51a provided on the outer circumference of the cam frame 51 (the second frame) are larger in thread height and wider in thread width than the male helicoid gears 51b provided at a plurality of positions. And, as shown in FIG. 8, the thread width of the set-up position restricting male helicoid gears 51a is wider than the root width of the female helicoid gears 50f.

The stationary frame 50 (the first frame) is provided with the set-up position restricting female helicoid gears 50e and the female helicoid gears 50f at locations corresponding to the set-up position restricting male helicoid gears 51a and the male helicoid gears 51b, respectively. The root width of each of the set-up position restricting female helicoid gears 50e, which are to accommodate male helicoid gears 51a, is larger than the root width of each of the female helicoid gears 50f, which are to accommodate male helicoid gears 51b.

Position restricting projection guide portions 50j are threads which form the set-up position restricting female helicoid gears 50e, and extend to a wall portion 50l. This forms the set-up position restricting groove 50h. Thread portions 50k form the female helicoid gears 50f and ends of these gears 50f are each spaced a predetermined distance apart from the wall portion 50l. In this way, the set-up position restricting groove 50h is defined by optical axial ends of the respective thread portions 50k and the wall portion 50l.

Incidentally, the position restricting projection guide portions 50j have a shorter thread height in a portion that extends into the set-up position restricting groove 50h. These shorter thread height portions of the position restricting projection guide portions define male helicoid inserting portions 50m. The heights of (i) the position restricting projection guide portions 50j (except at the male helicoid inserting portions 50m), (ii) the thread portions 50k and (iii) the wall portion 50l are approximately equal.

In the above-described construction, during the set-up movement of causing the lens barrel 5b to move from the collapsed position L1 to the photographing position, the set-up position restricting male helicoid gears 51a are displaced along the set-up position restricting female helicoid gears 50e according to the rotation of the cam frame 51, and enter an end of the set-up position restricting groove 50h defined by the male helicoid insertion part 50m. As the cam frame 51 is rotated further, the set-up position restricting male helicoid gears 51a are displaced to the wide angle end position L2 shown in FIG. 8, and mesh with the set-up position restricting groove 50h defined by the wall portion 50l and the ends of the thread portions 50k. Namely, the end surfaces of each of the set-up position restricting male helicoid gears 51a that are faced in the direction of the optical axis and the set-up position restricting groove 50h mesh with each other. Accordingly, the position of the cam frame 51 in the direction of the optical axis is defined. In this state, the meshed relationship between the male helicoid of the cam frame 51 and the female helicoid of the stationary frame 50 is released.

Similarly, the male helicoid gears 51b also enter the set-up position restricting groove 50h, and mesh with the set-up position restricting groove 50h with slight looseness as compared with the mesh between the set-up position restricting male helicoid gears 51a and the set-up position restricting groove 50h. Accordingly, when only the set-up position restricting gears 51a mesh with the set-up position restricting groove 50h, the position of the cam frame 51 in the direction of the optical axis can be defined by only the set-up position restricting male helicoid gears 51a, whereby smooth driving and accurate positioning can be realized.

As described above, the set-up position restricting groove 50h functions a second-frame position restricting groove for restricting the position in the direction of the optical axis, of the cam frame 51 (the second frame). The set-up position restricting male helicoid gears 51a function as position restricting projections for restricting the position in the direction of the optical axis, of the cam frame 51 (the second frame). The root portions which form the set-up position restricting female helicoid gears 50e function as a position restricting projection guide groove for guiding the position restricting projections 51a from the collapsed position L1 to the projected position.

In addition, since the male helicoid gears 51b are set to be smaller in thread height than the set-up position restricting male helicoid gears 51a, and since the male helicoid inserting portions 50m are formed in the respective position restricting projection guide portions 50j, when the cam frame 51 is rotating during zoom driving, the male helicoid gears 51b and the position restricting projection guide portions 50j do not interfere with one another. That is, the male helicoid insertion portions 50m can only restrict the "taller" male helicoid gears 51a. Accordingly, the rotation angle of the cam frame 51 for zoom driving can be set large, only limited by the male helicoid insertion portions 50m and the "taller" male helicoid gears 51a.

Furthermore, since the set-up position restricting male helicoid gears 51a are larger in thread height than the male helicoid gears 51b, the amount of mesh between the set-up position restricting male helicoid gears 51a and the set-up position restricting groove 50h can be made large. Accordingly, even if external force is applied to the cam frame 51, the position restriction of the cam frame 51 can be reliably maintained. Thus, it is possible to obtain a lens barrel of high strength.

Since the thread width of the set-up position restricting male helicoid gears 51a is wider than the root width of the female helicoid gears 50f, it is possible to prevent the set-up position restricting male helicoid gears 51a from meshing with the female helicoid gears 50f while the male helicoid gears 51a move along the set-up position restricting groove 50h.

On the other hand, in the case where the lens barrel 5b is driven from the photographing position to the collapsed position, the set-up position restricting male helicoid gears 51a move in the set-up position restricting groove 50h toward the left as viewed in FIG. 8 together with the rotation of the cam frame 51. Then, circumferential end portions of the set-up position restricting male helicoid gears 51a come to abut the position restricting projection guide portions 50j which form the thread portions of the set-up position restricting female helicoid gears 50e. When the cam frame 51 is rotated further in a collapsing direction from this state, the set-up position restricting male helicoid gears 51a are guided by the position restricting projection guide portions 50j and mesh with the set-up position restricting female helicoid gears 50e. Simultaneously, the male helicoid gears 51b also mesh with the female helicoid gears 50f. In this manner, the male helicoid of the cam frame 51 and the female helicoid of the stationary frame 50 mesh with each other, whereby the lens barrel 5b is displaced to the collapsed position.

In this manner, the position restricting projection guide portions 50j guide the thread portions of the set-up position restricting male helicoid gears 51a (which are position restricting projections) from the set-up position restricting groove 50h to the root portions of the set-up position restricting female helicoid gears 50e (which are position restricting projection guide grooves).

A structure for securing the deformable mirror 40 to the stationary frame 50, which moves in combination with the zooming operation of the lens barrel 5b having the above-described construction, will be described below in detail with reference to FIGS. 10 and 11.

Figure 10:
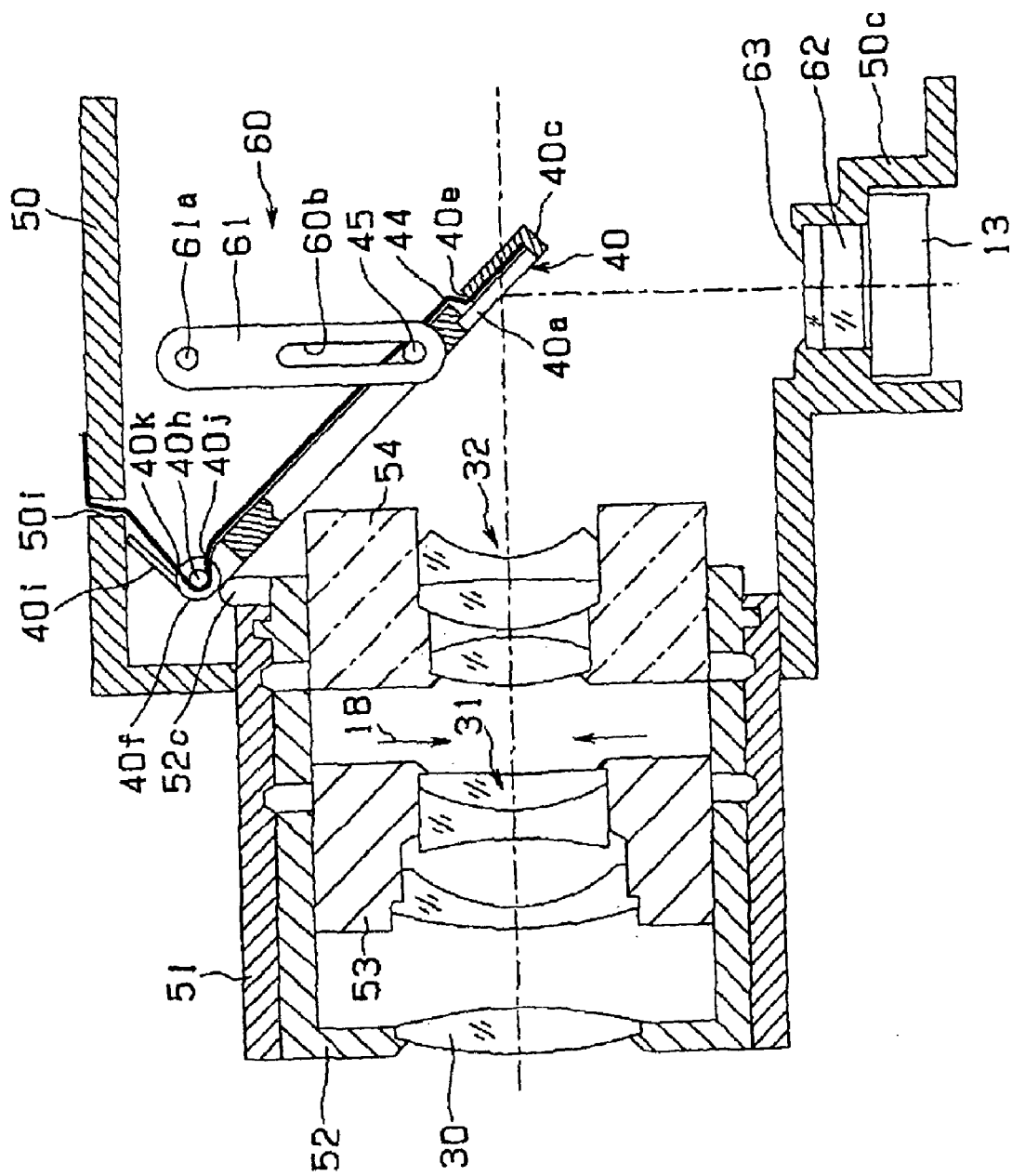
FIG. 10 is a cross-sectional view of the essential portions of the lens barrel placed at a wide angle end.
Figure 11:
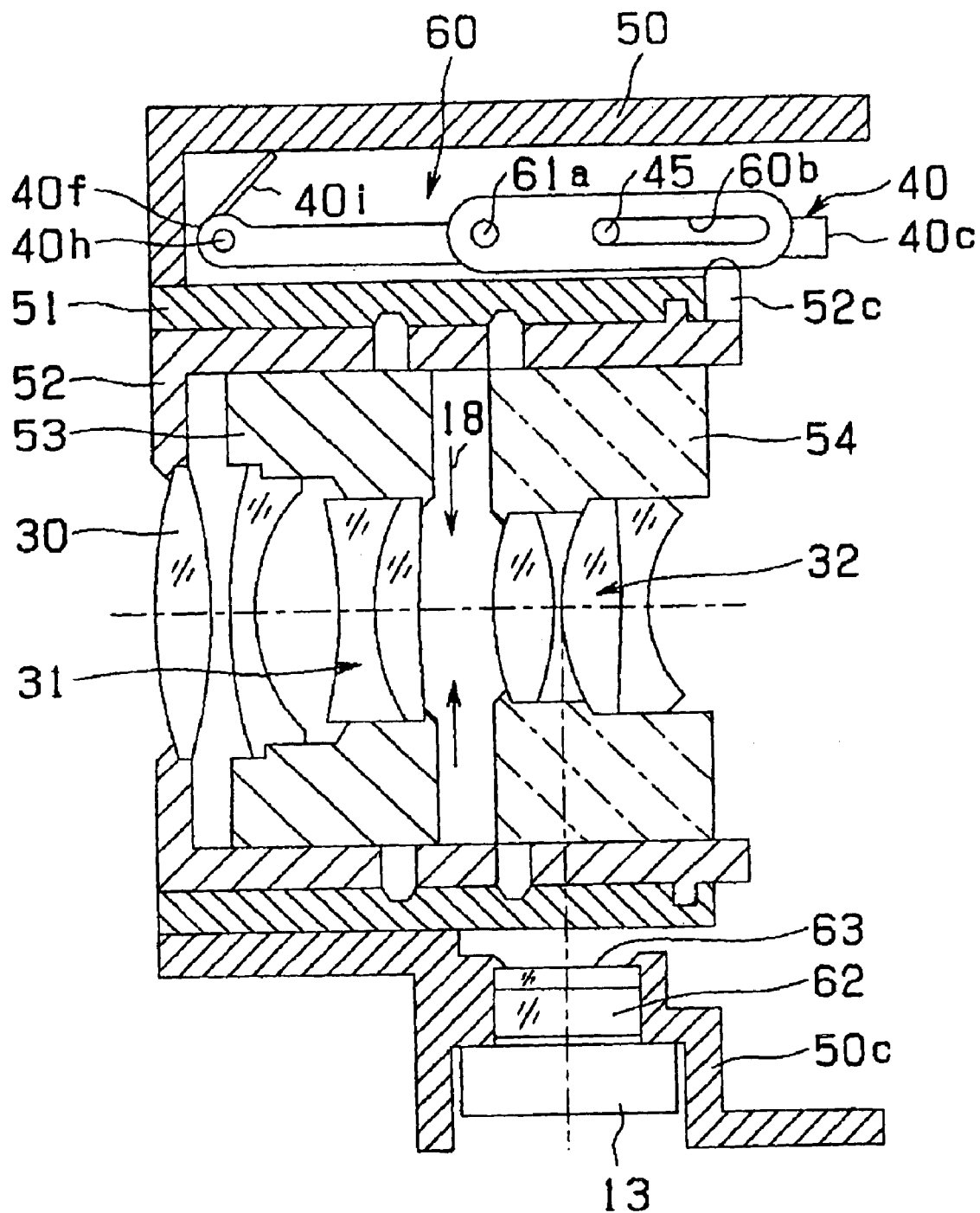
FIG. 11 is a cross-sectional view of the essential portions of the lens barrel placed at a collapsed position.

FIGS. 10 and 11 are explanatory views of the construction and the operation of the securing structure of the deformable mirror 40. FIG. 10 is a cross-sectional view of the portions of the lens barrel 5b placed in the wide angle end state, and FIG. 11 is a cross-sectional view of the portions of the lens barrel 5b placed in the collapsed state.

First, the securing structure of the deformable mirror 40 will be described below.

As shown in FIG. 10, the deformable mirror 40 is supported to be insertable into and retractable from the light path of the first to third lens groups 30 to 32 by the link mechanism 60. Namely, the deformable mirror 40 is secured so that when the lens barrel 5b lies at the collapsed position, the deformable mirror 40 can be retracted from the light path, and when the lens barrel 5b lies at a photographing position, the deformable mirror 40 can be inserted into the light path.

The deformable mirror 40 is turnably supported in the mirror holding part 50a of the stationary frame 50 in such a way that the mirror turning shaft 40h inserted through the bearing parts 40f is pivotally supported in the mirror holding part 50a of the stationary frame 50. In this case, the urging spring 40i is engaged with the mirror holding part 50a of the stationary frame 50 and the bearing parts 40f, and this urging spring 40i normally urges the mirror holding frame 40c toward the interior of the stationary frame 50 (in the direction of the optical axis).

The link mechanism 60 includes mirror link members 61 for movably supporting the mirror holding frame 40c. Each of these mirror link members 61 is turnably supported at its proximal end by a link shaft 61a, and this link shaft 61a is pivotally supported in the mirror holding part 50a of the stationary frame 50, thereby enabling the mirror link members 61 to turn about the link shaft 61a.

A slot-shaped guide hole 60b is formed to extend from the vicinity of the center of each of the mirror link members 61 toward the vicinity of one end of the same. Holding frame pins 45 which are respectively fixed to the opposite sides of the mirror holding frame 40c at positions somewhat close to the thin film 40a from the center of the mirror holding frame 40c are fitted movably in the respective guide holes 60b. Namely, since the holding frame pins 45 are guided by their engagement with the guide holes 60b, the mirror holding frame 40c can be turned according to the turn of the mirror link members 61. A flexible printed circuit board 44 led from the deformable mirror 40 is extended to the back side of the mirror holding frame 40c through the flexible printed circuit board inserting hole 40e of the mirror holding frame 40c, and after having been led to run on the back side of the mirror holding frame 40c, the flexible printed circuit board 44 is led to be wound around the object side of the mirror shaft 40h from a flexible printed circuit board inserting hole 40j formed in the vicinity of the mirror shaft 40h. After that, the proximal end of the flexible printed circuit board 44 is electrically connected to an electronic control circuit including the mirror driving circuit 26 and the CPU 11 via a flexible printed circuit board inserting hole 40k formed in the top portion of the bearing parts 40f and a flexible printed circuit board inserting hole 50i of the stationary frame 50. Namely, the above-described wiring pattern is simple and preferred because it does not influence the turning of the deformable mirror 40.

Incidentally, the image pickup device 13 is fixed to the CCD holding part 50c of the stationary frame 50, and an optical low-pass filter 62 and an infrared cut filter 63 are disposed on the image pickup device 13 in a stacked manner. The optical low-pass filter 62 and the infrared cut filter 63, which are disposed at the front stage of the image pickup device 13, eliminates unnecessary reflected light from the deformable mirror 40 and helps to improve image-forming performance.

In this camera 1, the turning of the deformable mirror 40 having the above-described construction is mechanically driven in combination with the zooming operation of the lens barrel 5b. Namely, as shown in FIG. 10, the pressing part 52c of the zooming frame 52 that is disposed at the rear end of the lens barrel 5b is disposed to be able to come into contact with a part of the reflecting surface side of the mirror holding frame 40c of the deformable mirror 40, and during the zooming operation of the lens barrel 5b from the wide angle end position to the telephoto end position, the pressing part 52c is placed in a non-contact state or in such a contact state that the pressing part 52c does not influence the turning of the mirror holding frame 40c.

During this time, since the mirror holding frame 40c is urged toward the interior of the stationary frame 50 (towards and intersecting the optical axis) by the urging spring 40i, the mirror holding frame 40c is pressed down by this urging force, and the holding frame pins 45 of the mirror holding frame 40c are respectively brought into contact with the bottoms of the guide holes 60b of the mirror link members 61 and are held in this state. Accordingly, the deformable mirror 40 is positioned in the light path defined by the first to third lens groups 30 to 32, whereby light coming through the first to third lens groups 30 to 32 can be reflected by the thin film 40a of the deformable mirror 40 onto the image pickup device 13.

On the other hand, when the lens barrel 5b is shifted from the wide angle end position to the collapsed position, although the mirror holding frame 40c is urged toward the interior of the stationary frame 50 (in the direction of the optical axis) by the urging spring 40i, the pressing part 52c of the zooming frame 52 disposed at the rear end of the lens barrel 5b presses the mirror holding frame 40c upward while smoothly sliding in contact with the reflecting surface side of the mirror holding frame 40c of the deformable mirror 40 in accordance with the collapsing of the lens barrel 5b into the stationary frame 50. In accordance with this movement, the holding frame pins 45 of the mirror holding frame 40c turn the mirror link members 61 upward while being guided by the guide holes 60b of the mirror link members 61.

After that, when the lens barrel 5b completely reaches the collapsed position, the mirror holding frame 40c is completely pressed up, and at the same time, the holding frame pins 45 turn the mirror link members 61 upward while preferably being held in contact with the tops of the guide holes 60b (the proximal ends of the guide holes 60b closer to the link shaft 61a), whereby the mirror holding frame 40c is positioned at a photography-disabled retracted position. Namely, when the lens barrel 5b is collapsed, the optical function of the deformable mirror 40 is not needed, so that the deformable mirror 40 may be retracted from the light path of the first to third lens groups 30 to 32, e.g., completely accommodated in the mirror holding part 50a. In this case, the mirror holding frame 40c is normally urged in the direction of the optical axis by the urging spring 40i, to be held against the pressing parts 52C. Consequently, even if the camera 1 is shaken while being carried, the deformable mirror 40 does not shake, and can be reliably held in an accommodated state.

An example of the photographing operation control of the CPU 11 incorporated in the camera 1 will be described below with reference to FIG. 12.

Figure 12:
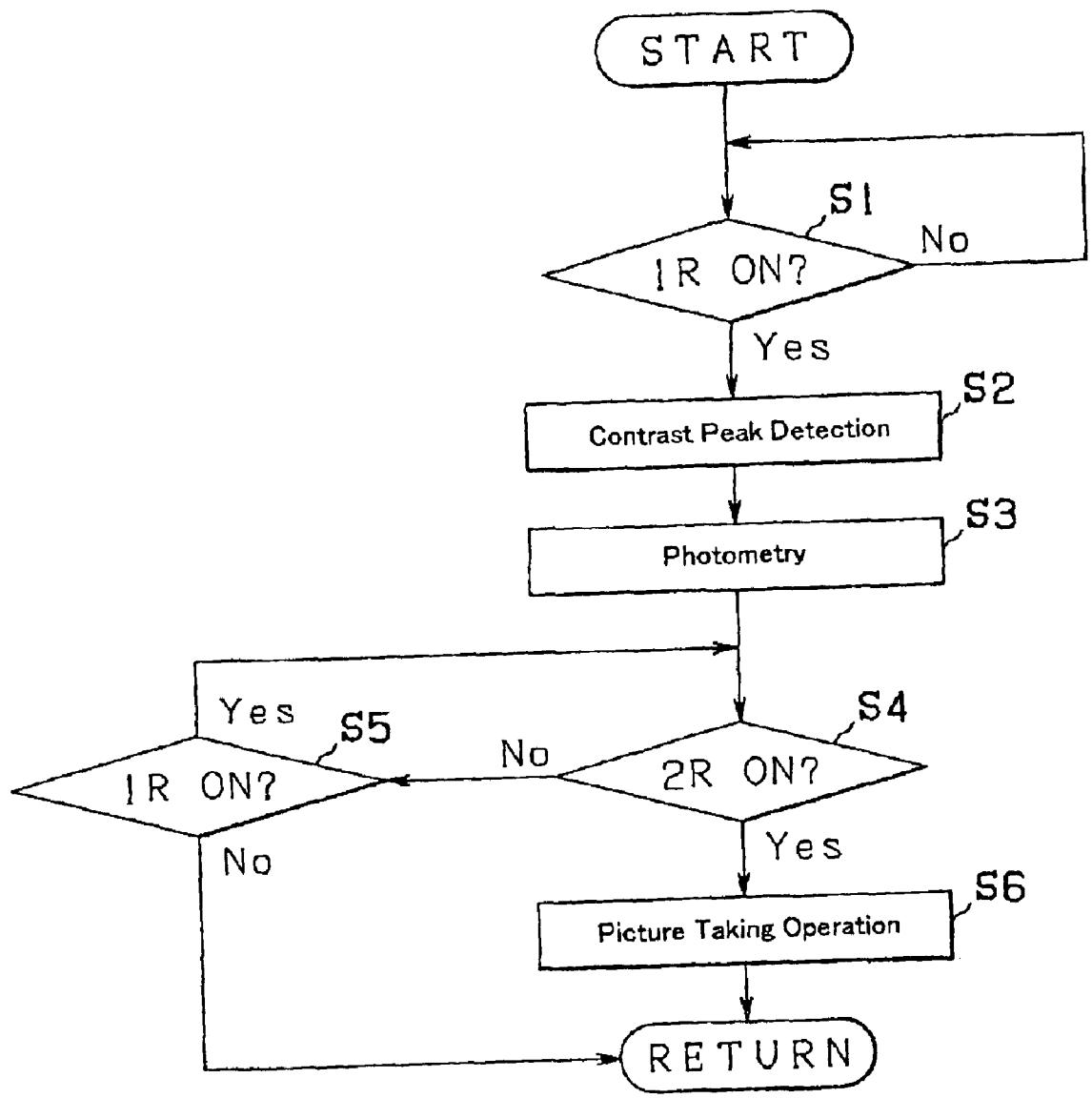
FIG. 12 is a flowchart showing an example of the photographing operation control of a CPU incorporated in the camera.

FIG. 12 is a flowchart showing an example of the photographing operation control of the CPU 11 incorporated in the camera 1. The AF system adopted in this example is, for example, a known hill-climbing scheme auto-focus system or contrast detection type auto-focus system. The shape of the thin film 40a of the deformable mirror 40 may also be controlled on the basis of the result of distance detection using other distance detection systems such as an active auto-focus system and a phase difference detection (passive) type auto-focus system.

It is assumed now that the power source switch (not shown) of the camera 1 shown in FIG. 1 is turned on and the lens barrel 5b is zoomed by the manipulation of the lever ZL so that a picture can be taken at the desired angle. It is also assumed that the deformable mirror 40 is positioned as shown in FIG. 10 by the link mechanism 60 as the result of the zooming of the lens barrel 5b.

At this time, the CPU 11 determines in the Step S1 whether the first release detecting switch 8a has been turned on by the depression of the release button 8, and stands by until the first release detecting switch 8a is turned on. After that, if the CPU 11 determines in the Step S1 that the first release detecting switch 8a has been turned on by the depression of the release button 8, the CPU 11 transfers the process to the next step S2.

If the CPU 11 determines that the first release detecting switch 8a has been turned on, the CPU 11 performs contrast peak detecting process in the Step S2. In this contrast peak detecting process, since a picked-up image signal supplied from the image pickup device 13 is subjected to signal processing by the image signal processing circuit 14 and the obtained contrast data is supplied to the CPU 11, the CPU 11 performs control on the mirror driving circuit 26 (refer to FIG. 3) to vary the shape of the thin film 40a of the deformable mirror 40 in a step-by-step manner, thereby detecting the contrast of the picked-up image signal. On the basis of the detection result, the CPU 11 performs control on the mirror driving circuit 26 to vary the shape of the thin film 40a of the deformable mirror 40 so that the contrast is maximized. Thus, the camera 1 is brought into an in-focus state.

Incidentally, the camera 1 may also be constructed to have a storage part which previously stores control information for comparing contrast data and the state of deformation of the thin film 40a of the deformable mirror 40. The CPU 11 uses the control information stored in the storage part to control the shape of the thin film 40a of the deformable mirror 40 so that contrast is maximized.

When the in-focus state is reached in this manner, the CPU 11 performs photometric measurement processing in the next step S3. For example, the CPU 11 performs photometric measurement using picked-up image data supplied from the image signal processing circuit 14. Incidentally, the photometric measurement processing may be executed with a known algorithm.

Then, the CPU 11 transfers the process to Step S4, and determines in the Step S4 whether the second release detecting switch 8b has been turned on by the depression of the release button 8. If the CPU 11 determines that the second release detecting switch 8b has been turned on, the CPU 11 transfers the process to the next step S6. If the CPU 11 determines that the second release detecting switch 8b is off, the CPU 11 determines in the next step S5 whether the first release detecting switch 8a has been turned on. If the CPU 11 determines that the first release detecting switch 8a has been turned on, the CPU 11 returns the process to Step S4 and stands by until the second release detecting switch 8b is turned on. If the CPU 11 determines in the Step S5 that the first release detecting switch 8a is off, the CPU 11 brings the process to an end.

When the second release detecting switch 8b is turned on, the CPU 11 performs control in the image pickup device 13 to execute image pickup process using the image pickup device 13. In this manner, photography is completed, and the CPU 11 brings the camera 1 into a photography-enabled state.

Accordingly, in this example, the camera 1 is provided with the deformable mirror 40 which can be inserted into and retracted from the light path of the picture taking optical system 5a by means of the lens barrel 5b which linearly moves back and forth in the directions of the optical axis, whereby the picture taking optical system having a small size and a simple construction can be formed in the camera 1. In addition, the fact that the image pickup device 13 is disposed on the stationary frame 50 of the lens barrel 5b greatly contributes to a reduction in the size of the camera 1.

In this manner, the deformable mirror 40 is arranged at the rear stage of the position of the aperture diaphragm 18 of the picture taking optical system 5a, and the first to third lens groups 30 to 32 driven back and forth during zooming are arranged in the lens barrel 5b which can be projected from and retracted into the camera body 2. Accordingly, even if an optical system having a particularly high zooming ratio is used, the size of the camera body 2 need not be extremely increased. When the lens barrel 5b is to be collapsed, the deformable mirror 40 is retracted, and the lens barrel 5b is accommodated into a space remaining after the retraction of the deformable mirror 40. Accordingly, the size of the camera 1 with the lens barrel 5b accommodated can be reduced. In this example in particular, since the deformable mirror 40 is disposed on the rearmost side of the picture taking optical system 5a (a position closest to a picture taking medium in the picture taking optical system), no other optical lens elements need be disposed in the camera body 2, whereby it is possible to achieve a further reduction in the size of the camera 1.

In addition, since the optical characteristics of the mirror can be varied by electrical control, a lens driving mechanism can be simplified or omitted, whereby it is possible to realize not only a reduction in the camera size but also high speed response and silent operation.

In addition, since the camera 1 is constructed so that the turning operation of the deformable mirror 40 is executed by the link mechanism 60 and the lens barrel 5b which linearly moves back and forth in the direction of the optical axis, it is possible to achieve the advantages of suppressed driving noise and enabling high speed response.

Furthermore, driving and control for deformation of the thin film 40a of the deformable mirror 40 can be achieved with an extremely small electric current value, whereby the consumption of the battery of the camera 1 can be minimized, thereby saving energy.

In addition, in this example, when the deformable mirror 40 is to be retracted from the light path, the mirror holding frame 40c is pressed by the frame member of the lens barrel 5b that is driven linearly in the direction of the optical axis, so that the frame member comes into contact with the mirror holding frame 40c in the hatched areas shown in FIG. 6. Accordingly, since the sliding locus of the pressing part 52c formed on the zooming frame 52, which is a driving frame, becomes linear, a space in which to dispose the deformable mirror 40 can be provided in the center of the mirror holding frame 40c, so that the size of the camera can be reduced.

Furthermore, since the lens groups and the deformable mirror which are constituent elements of the picture taking optical system are directly or indirectly held by the stationary frame which is formed as a single frame member, the positional relationship between the lens groups and the deformable mirror can be determined with high precision, and the optical performance of the picture taking optical system is not impaired. In addition, since the image pickup device is also held by the stationary frame, the lens groups, the deformable mirror and the image pickup device can be positioned with higher precision.

Incidentally, in this example, the deformable mirror is used for focusing, but the deformable mirror is not limited to such a use. For example, the deformable mirror may be used for zooming the picture taking optical system, or may also be used for various corrections such as correction of aberration accompanying zooming operation. Accordingly, the invention can of course greatly contribute to reducing the size of the camera 1, and can also improve the performance of the camera 1.

In addition, according to this example, the position of the barrel frame in the direction of the optical axis is defined with respect to the projected position by using the helicoids to be used for the movement of the lens barrel 5b from the collapsed position to the photography-enabled projected position. Accordingly, set-up and turn-off driving between the collapsed position and the projected position and zoom-in and zoom-out driving between the wide angle end position and the telephoto end position are realized without using any complicated mechanism. Namely, the switching of power between the set-up movement and the zooming movement is not at all needed.

In addition, independent driving means are respectively used for set-up movement and zooming movement, whereby the amount of set-up driving and the amount of zooming driving can be set large.

This invention is not limited to the above described example and a lot of variation are possible within the scope of this invention. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A picture taking apparatus comprising:
   a lens barrel movable between a collapsed state where the lens barrel is accommodated in a body of the apparatus and a photographing state where the lens barrel projects from the body of the apparatus;
   a picture taking optical system including
      a lens groups driven to move along an optical axis by the lens barrel, and
      a deformable mirror supported in the lens barrel;
   a retracting mechanism for retracting the deformable mirror from a light path of the picture taking optical system when the lens barrel is in the collapsed state, and inserting the deformable mirror into the light path of the picture taking optical system when the lens barrel is in the photographing state; and
   a control part for varying a reflecting surface shape of the deformable mirror to vary optical power thereof.

2. The picture taking apparatus recited in claim 1, wherein the control part varies the reflecting surface shape of the deformable mirror according to an object distance.

3. The picture taking apparatus recited in claim 1, wherein the picture taking optical system has variable magnification power, the control part varying the reflecting surface shape of the deformable mirror according to a variation in magnification of the picture taking optical system.

4. A picture taking apparatus comprising:
   a lens barrel movable between a collapsed state where the lens barrel is accommodated in a body of the apparatus and a photographing state where the lens barrel projects from the body of the apparatus;
   a stationary frame fixed with respect to the body of the apparatus;
   a picture taking optical system including
      a lens group driven to move along an optical axis by the lens barrel and
      a deformable mirror supported in the lens barrel;
   a driving frame movable relative to the stationary frame in a direction of an optical axis;
   a holding frame which holds the deformable mirror to allow the deformable mirror to move between a first position in a light path of the picture taking optical system and a second position outside the light path, and which is supported on the stationary frame,
   an urging member which urges the holding frame toward the first position, and positions the holding frame at the first position when the lens barrel is in the photographing state;

a part provided on the driving frame and capable of forcing the holding frame toward the second position, the part forcing the deformable mirror toward the second position against an urging force of the urging member when the lens barrel moves from the photographing state to the collapsed state; and a control part for deforming a reflecting surface shape of the deformable mirror.

5. The picture taking apparatus recited in claim 4, wherein the control part varies the reflecting surface shape of the deformable mirror according to an object distance.

6. The picture taking apparatus recited in claim 4, wherein the picture taking optical system has variable magnification power, the control part varying the reflecting surface shape of the deformable mirror according to a variation in magnification of the picture taking optical system.

7. The picture taking apparatus recited in claim 4, further comprising an image pickup element which is fixed to the stationary frame at a position where the image pickup element receives light reflected from the deformable mirror, and picks up an image formed by the picture taking optical system.

8. The picture taking apparatus recited in claim 4, the picture taking optical system further comprising an aperture diaphragm, wherein the deformable mirror is disposed on the light path between an image pickup element and the aperture diaphragm.

9. The picture taking apparatus recited in claim 8, wherein the deformable mirror is disposed on a rearmost position of the picture taking optical system.

10. The picture taking apparatus of claim 4 further comprising:

a lead wire for passing control signals to the deformable mirror, wherein the stationary frame has a defined hole through which the lead wire passes.

11. A lens barrel which can be used with a picture taking apparatus and movable between a collapsed state where the lens barrel is accommodated in a body of the picture taking apparatus and a photographing state where the lens barrel projects from the body the apparatus, comprising:

a picture taking optical system including
  a lens group movable along an optical axis, and
  a deformable mirror supported in the lens barrel, the deformable mirror having a variable reflecting surface to permit optical power of the deformable mirror to be varied; and a retracting mechanism which retracts the deformable mirror from a light path of the picture taking optical system when the lens barrel is in the collapsed state, and inserts the deformable mirror into the light path of the picture taking optical system when the lens barrel is in the photographing state.

12. The lens barrel recited in claim 11, wherein the deformable mirror has a reflecting surface whose shape varies according to a distance to an object.

13. The lens barrel recited in claim 11, wherein the picture taking optical system has variable magnification power, and the deformable mirror has a reflecting surface whose shape is controlled to vary according to a variation in the variable magnification power.

14. The lens barrel recited in claim 11, the picture taking optical system further comprising an aperture diaphragm, wherein the deformable mirror is disposed on the light path between the image pickup element and the aperture diaphragm.

15. The lens barrel recited in claim 14, wherein the deformable mirror is disposed on a rearmost position of the picture taking optical system.

16. A lens barrel which can be used with a picture taking apparatus and movable between a collapsed state where the lens barrel is accommodated in a body of the picture taking apparatus and a photographing state where the lens barrel projects from the body of the picture taking apparatus, comprising:

a stationary frame;

a picture taking optical system including
  a lens group movable along an optical axis, and
  a deformable mirror having a reflecting surface whose shape is variable;

a driving frame movable relative to the stationary frame;

a holding frame which holds the deformable mirror to allow the deformable mirror to move between a first position inside a light path of the picture taking optical system and a second position outside the light path, and which is supported on the stationary frame;

an urging member which urges the holding frame toward the first position, and positions the holding frame at the first position when the lens barrel is in the photographing state; and a part provided on the driving frame and capable of forcing the holding frame toward the second position, the pressure part forcing the deformable mirror toward the second position against an urging force of the urging member when the lens barrel moves from the photographing state to the collapsed state.

17. The lens barrel recited in claim 16, wherein the deformable mirror has a reflecting surface whose shape varies according to a distance to an object.

18. The lens barrel recited in claim 16, wherein the picture taking optical system has variable magnification power, and the deformable mirror has a reflecting surface whose shape varies according to a variation in the variable magnification power.

19. The lens barrel recited in claim 16, further comprising an image pickup element provided at a position where the image pickup element can receive light reflected from the deformable mirror, wherein the image pickup element is fixed to the stationary frame.

20. The lens barrel recited in claim 16, the picture taking optical system further comprising an aperture diaphragm, wherein the deformable mirror is disposed between the aperture diaphragm and an image capture element.

21. The lens barrel recited in claim 20, wherein the deformable mirror is disposed on a rearmost position of the picture taking optical system.

22. The lens barrel recited in claim 16, wherein the driving frame linearly moves along the optical axis without rotating about the optical axis.

23. The lens barrel recited in claim 16, wherein the holding frame is secured to the stationary frame by a rotating shaft, a flexible printed circuit board being secured to the holding frame, a part of the flexible printed circuit board being disposed to be wound around the rotating shaft.

24. A lens barrel comprising:

a stationary frame;

an optical system including
  a lens group movable along an optical axis, and
  a deformable mirror having a reflecting surface whose shape is variable;

a driving frame movable relative to the stationary frame;

a holding frame which holds the deformable mirror to allow the deformable mirror to move between a first position inside a light path of the optical system and a second position outside the light path, and which is supported on the stationary frame;

an urging member which urges the holding frame toward the first position, and positions the holding frame at the first position; and a part provided on the driving frame and capable of forcing the holding frame toward the second position, the part forcing the deformable mirror toward the second position against an urging force of the urging member;

wherein the driving frame is movable along the optical axis between positions projected from and accommodated in the stationary frame; and wherein the movable lens groups is accommodated in the driving frame when the driving frame is positioned in the stationary frame.

25. The lens barrel recited in claim 24, wherein the picture taking optical system has variable magnification power.

26. The lens barrel recited in claim 24, further comprising an image pickup element provided at a position where the image pickup element can receive light reflected from the deformable mirror, wherein the image pickup element is fixed with respect to the stationary frame.

27. The lens barrel recited in claim 24, the optical system further comprising an aperture diaphragm, wherein the deformable mirror is disposed between the aperture diaphragm and an image capture element.

28. The lens barrel recited in claim 24, wherein the deformable mirror is disposed on a rearmost position of the optical system.

29. The lens barrel recited in claim 24, wherein the driving frame linearly moves along the optical axis without rotating about the optical axis.

30. The lens barrel recited in claim 16, wherein the holding frame is secured to the stationary frame by a rotating shaft, a flexible printed circuit board being secured to the holding frame, a part of the flexible printed circuit board being disposed to be wound around the rotating shaft.

* * * * *